(12) United States Patent
Hand

(10) Patent No.: US 8,656,571 B2
(45) Date of Patent: Feb. 25, 2014

(54) STRONG BONDED JOINTS FOR CRYOGENIC APPLICATIONS

(75) Inventor: Michael Leslie Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1303 days.

(21) Appl. No.: 12/175,735

(22) Filed: Jul. 18, 2008

(65) Prior Publication Data

US 2010/0012787 A1 Jan. 21, 2010

(51) Int. Cl.
*B23P 11/00* (2006.01)

(52) U.S. Cl.
USPC ............................................ 29/281.1; 29/235

(58) Field of Classification Search
USPC ................... 29/281, 281.3, 235, 559, 412; 244/158.1; 607/2; 623/23.75, 23.58; 428/608, 614; 87/5; 139/383 R
See application file for complete search history.

(56) References Cited

U.S. PATENT DOCUMENTS

| | | | |
|---|---|---|---|
| 2,755,216 A | 7/1956 | Lemons | |
| 3,243,150 A | 3/1966 | Woodcock | |
| 3,400,849 A | 9/1968 | Pottier et al. | |
| 3,814,275 A | 6/1974 | Lemons | |
| 4,331,723 A | 5/1982 | Hamm | |
| 4,395,450 A | 7/1983 | Whitener | |
| 4,452,162 A | 6/1984 | Harbaugh | |
| 4,922,798 A * | 5/1990 | Ivsan et al. | 87/8 |
| 5,018,634 A | 5/1991 | LeTouche | |
| 5,026,595 A | 6/1991 | Crawford, Jr. et al. | |
| 5,338,383 A | 8/1994 | Polackwoyj | |
| 5,611,453 A | 3/1997 | Schwartz et al. | |
| 5,628,363 A | 5/1997 | Dewar et al. | |
| 5,651,474 A | 7/1997 | Callaghan et al. | |
| 5,655,600 A | 8/1997 | Dewar et al. | |
| 5,845,399 A | 12/1998 | Dewar et al. | |
| 5,951,812 A | 9/1999 | Gilchrist, Jr. | |
| 6,267,175 B1 | 7/2001 | Anderson et al. | |
| 6,374,570 B1 | 4/2002 | McKague, Jr. | |
| 6,422,514 B1 | 7/2002 | Clark et al. | |
| 6,562,436 B2 | 5/2003 | George et al. | |
| 6,689,448 B2 | 2/2004 | George et al. | |
| 6,709,538 B2 | 3/2004 | George et al. | |
| 6,757,954 B2 * | 7/2004 | Sei | 29/412 |
| 6,835,261 B2 | 12/2004 | Schmidt | |

(Continued)

FOREIGN PATENT DOCUMENTS

| | | |
|---|---|---|
| CA | 2203863 A1 | 10/1998 |
| EP | 1149687 A2 | 10/2001 |

(Continued)

OTHER PUBLICATIONS

"Softening Strip Material Characterization", DC-XA Task 2 Test Report 6.0.Doc, retrieved Jun. 27, 2008, pp. 1-9.

(Continued)

*Primary Examiner* — Lee D Wilson
(74) *Attorney, Agent, or Firm* — Yee & Associates, P.C.

(57) ABSTRACT

A method and apparatus for strong bonded wide joints for cryogenic applications. In one advantageous embodiment, an apparatus may comprise a three-dimensional preform and a plastic matrix. The plastic matrix may be impregnated in the three-dimensional preform to form a softening strip that may be capable of remaining flexible at a temperature at which a gas may have a liquid form.

17 Claims, 8 Drawing Sheets

(56) References Cited

U.S. PATENT DOCUMENTS

| | | | |
|---|---|---|---|
| 6,846,758 B2 * | 1/2005 | Bhatnagar et al. | 442/135 |
| 6,863,767 B2 | 3/2005 | Bersuch et al. | |
| 6,874,543 B2 * | 4/2005 | Schmidt et al. | 139/383 R |
| 6,945,727 B2 | 9/2005 | Christman et al. | |
| 7,669,729 B2 | 3/2010 | Matsuoka et al. | |
| 7,790,294 B2 * | 9/2010 | Macguire et al. | 428/608 |
| 7,904,147 B2 * | 3/2011 | Schneider et al. | 607/2 |
| 8,042,767 B2 | 10/2011 | Velicki et al. | |
| 2001/0047862 A1 | 12/2001 | Anderson et al. | |
| 2003/0000641 A1 * | 1/2003 | Schmidt | 156/307.3 |
| 2006/0065111 A1 * | 3/2006 | Henry | 89/36.02 |
| 2007/0239212 A1 * | 10/2007 | Schneider et al. | 607/2 |
| 2008/0256960 A1 | 10/2008 | Greason et al. | |
| 2009/0042474 A1 * | 2/2009 | Lin et al. | 442/310 |
| 2009/0311166 A1 | 12/2009 | Hart et al. | |
| 2010/0012787 A1 * | 1/2010 | Hand | 244/158.1 |
| 2010/0116420 A1 | 5/2010 | Matsuoka et al. | |
| 2011/0049750 A1 | 3/2011 | Bechtold | |
| 2012/0018587 A1 | 1/2012 | Robinson et al. | |
| 2012/0205493 A1 | 8/2012 | Robinson et al. | |
| 2013/0136527 A1 | 5/2013 | Robinson et al. | |
| 2013/0193151 A1 | 8/2013 | Robinson et al. | |

FOREIGN PATENT DOCUMENTS

| | | | |
|---|---|---|---|
| EP | 2006074 A1 | 12/2008 | |
| EP | 2354622 A1 | 8/2011 | |
| WO | WO9730321 A1 | 8/1997 | |
| WO | WO0216784 A2 | 2/2002 | |

OTHER PUBLICATIONS

"2D Softened Y-Joint Simulation", DC-XA Task 2 Test Report 7.0. Doc, retrieved Jun. 27, 2008, pp. 1-9.

U.S. Appl. No. 13/027,429, filed Feb. 15, 2011, Robinson et al.

U.S. Appl. No. 12/838,586, filed Jul. 19, 2010, Robinson et al.

Blanco et al., "Limiting Mechanisms of Mode I Interlaminar Toughening of Composites Reinforced with Alligned Carbon Nanotubes," Journal of Composite Materials, vol. 43, No. 8, Apr. 2009, 18 Pages.

Garcia et al., "Joining prepreg composite interfaces with aligned carbon nanotubes," Composites: Part A, Applied Science and Manufacturing, vol. 39, Issue 6, Jun. 2008, pp. 1065-1070.

Wicks et al., "Interlaminar and intralaminar reinforcement of composite laminates with aligned carbon nanotubes," Composite Science and Technology (2009), vol. 70, Issue 1, Jan. 2010, 9 Pages.

Wardle et al., "Fabrication and Characterization of Ultrahigh-Volume-Fraction Aligned Carbon Polymer Composites," Advanced Materials, vol. 20, Issue 14, Jun. 2008, 8 Pages.

Thomson, "'Nanostitching' could lead to much stronger airplane skins, more, Work could make airplane skins, other products 10 times stronger at a nominal additional cost," MIT News, Mar. 2009, 2 Pages, accessed Mar. 9, 2012 http://web.mit.edu/newsoffice/2009/nanostitching-0305.html.

International Search Report dated Nov. 4, 2011 regarding NAM/P117551GB00, application No. GB1111333.9, applicant The Boeing Company, 7 pages.

GB search report dated Nov. 4, 2011 regarding application GB1111333.9, applicant The Boeing Company, 7 Pages.

Robinson et al., U.S. Appl. No. 13/027,429, title of invention Common Bulkhead for Composite Propellant Tanks, filed Feb. 15, 2011, 52 Pages.

Koch IV, U.S. Appl. No. 12/841,413, title of invention Toughened Composite Filler and Method of Making the Same, filed Jul. 22, 2010, 44 Pages.

Veedu et al., "Multifunctional composites using reinforced laminae with carbon-nanotube forests," Nature Materials (www.nature.com/naturematerials), vol. 5, Jun. 2006, pp. 457-462, accessed Jun. 4, 2012 http://image.sciencenet.cn/olddata/kexue.com.cn/blog/admin//images/upfiles/20085981740331929.pdf.

Robinson et al., "Device for Controlling Stress in Joints at Cryogenic Temperatures and Method of Making the Same," U.S. Appl. No. 13/541,534, filed Jul. 3, 2012, 57 Pages.

Robinson et al., "Composite Tank Having Joint with Softening Strip and Method of Making the Tank," U.S. Appl. No. 13/541,560, filed Jul. 3, 2012, 55 Pages.

International Search Report, dated May 4, 2012, regarding Application No. PCT/US2011/065549, 12 pages.

Final Office Action, dated Mar. 6, 2013, regarding USPTO U.S. Appl. No. 12/841,413, 11 pages.

Search and Examination Report, dated Jan. 7, 2013, regarding Application No. GB1111333.9, 3 pages.

Office Action, dated Jul. 3, 2013, regarding USPTO U.S. Appl. No. 12/841,502, 42 pages.

Office Action, dated Oct. 15, 2012, regarding USPTO U.S. Appl. No. 12/841,413, 18 pages.

Office Action, dated Aug. 16, 2013, regarding USPTO U.S. Appl. No. 13/027,429, 37 pages.

* cited by examiner

STRONG BONDED JOINTS FOR CRYOGENIC APPLICATIONS

BACKGROUND INFORMATION

1. Field

The present disclosure relates generally to manufacturing vehicles and in particular to manufacturing spacecraft. Still more particularly, the present disclosure relates to a method and apparatus for manufacturing bonded joints for low temperature applications.

2. Background

A spacecraft may be a vehicle designed for space flight. Spacecraft may be used for various purposes, such as, for example, without limitation, communications, earth observation, meteorology, navigation, and other suitable functions. Spacecraft may be reusable. For example, without limitation, a space shuttle is an example of a reusable spacecraft. A launch vehicle may be another form of a spacecraft used to lift another spacecraft into orbit or space.

Both a space shuttle and a launch vehicle may have propulsion systems. These propulsion systems may include various types of propellants such as, for example, without limitation, a solid propellant, a liquid propellant, a mixture of both solid and liquid propellant, and/or any other suitable propellant. Liquid propellants may include, for example, without limitation, liquid hydrogen and/or liquid oxygen. These gases may be stored in liquid form in cryogenic tanks. A cryogenic tank may store and/or maintain liquid propellants at very low temperatures, such as, for example, without limitation, below −238 degrees Fahrenheit.

In a spacecraft or launch vehicle that uses these types of propellants, these tanks may be connected to the structure of the spacecraft using joints. A joint is a location and/or place where a first structure may be attached to a second structure. Y-joints may be used to connect the tanks to the spacecraft structures. It may be desirable to increase the strength of lap joints above current levels. A Y-joint with a softening strip may be used to provide the needed strength.

These types of joints, however, may be subjected to loading that exceeds the strength of simple lap joints. With the use of cryogenic propellants, the joints used to attach the tanks to the spacecraft structure may be subjected to very cold temperatures. Most materials for use as a softening strip may become too stiff at cryogenic temperatures and/or may have a coefficient of thermal expansion that may be incompatible with other joint components. A softening strip may be a component used to reinforce a joint.

Therefore, it would be advantageous to have a method and apparatus that overcomes the problems discussed above.

SUMMARY

The advantageous embodiments may provide a method and apparatus for strong bonded joints for cryogenic applications. In one advantageous embodiment, an apparatus may comprise a three-dimensional preform and a plastic matrix. The plastic matrix may be impregnated in the three-dimensional preform to form a softening strip that may be capable of remaining flexible at a temperature at which a gas may have a liquid form.

In another advantageous embodiment, a method may be present for forming a joint. A softening strip may be placed into a joint region for a first structure, wherein the softening strip is capable of remaining flexible at a temperature at which a gas has a liquid form. A second structure may be laid up. The softening strip may be bonded to the first structure and to the second structure to form the joint.

In yet another advantageous embodiment, a method may be present for manufacturing a softening strip. A three-dimensional preform may be formed. A plastic material may be infused into the three-dimensional preform to form a composite material capable of remaining flexible at a temperature at which a gas may have a liquid form.

In still yet another advantageous embodiment, a launch vehicle may comprise a structure, a tank, and a softening strip. The structure has a first side, wherein the structure may be comprised of a material selected from at least one of a metal, a metal alloy, and a composite material. The tank may be capable of holding a liquid propellant and may have a first side bonded to the first side of the structure. The tank may be comprised of a material selected from one of a metal, a metal alloy, and a composite material.

The softening strip may have a three-dimensional preform and a plastic matrix impregnated in the three-dimensional preform to form the softening strip that may be capable of remaining flexible at a temperature at which a gas may have a liquid form. The three-dimensional preform may be a three-dimensional fabric comprising at least one of weaved fibers, braided fibers, and stacked fabric layers in which the fibers are selected from one of graphite fibers, glass fibers, and aramid fibers. The plastic matrix may be selected from at least one of a fluorocarbon and a urethane. The softening strip may be bonded to the first side of the first structure and the first side of the tank to form a Y-joint.

In yet another advantageous embodiment, a method for forming a joint in a spacecraft is provided. A three-dimensional fabric perform is formed. A plastic material is infused into the three-dimensional fabric preform to form a plastic matrix to form a softening strip. The softening strip is capable of remaining flexible at a temperature at which a gas has a liquid form. The three-dimensional fabric preform is comprised of at least one of weaved fibers, braided fibers, and stacked fabric layers in which the fibers are graphite fibers. The plastic material is selected from at least one of a fluorocarbon and a urethane. A first adhesive layer is attached to a first side of the softening strip. A second adhesive layer is attached to a second side of the softening strip. The softening strip is placed into a joint region for a first structure of a spacecraft. The softening strip is capable of remaining flexible at a temperature at which a gas has a liquid form. A second structure is laid up for the spacecraft. The softening strip is co-cured to the first structure and to the second structure to form the joint.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
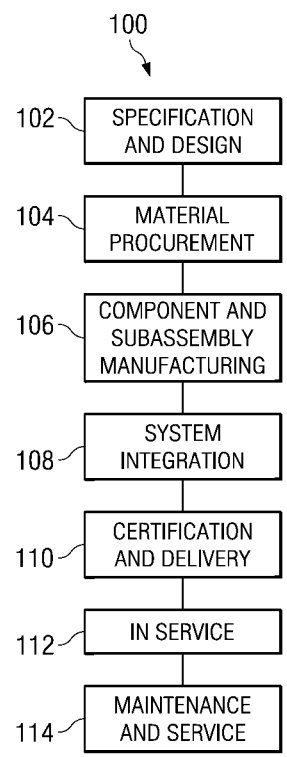
FIG. 1 is a diagram illustrating a spacecraft manufacturing and service method in which an advantageous embodiment may be implemented.
Figure 2:
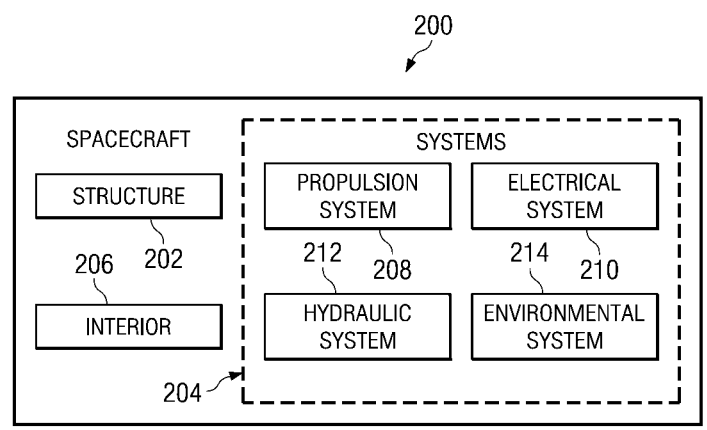
FIG. 2 is a diagram of a spacecraft in which advantageous embodiments may be implemented.

Referring more particularly to the drawings, embodiments of the disclosure may be described in the context of the spacecraft manufacturing and service method 100 as shown in FIG. 1 and spacecraft 200 as shown in FIG. 2. Turning first to FIG. 1, a diagram illustrating a spacecraft manufacturing and service method is depicted in accordance with an advantageous embodiment.

During pre-production, exemplary spacecraft manufacturing and service method 100 may include specification and design 102 of spacecraft 200 in FIG. 2 and material procurement 104. During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, for example, without limitation, any number of venders, subcontractors, and suppliers; and an operator may be a country, leasing company, military entity, service organization, and so on.

With reference now to FIG. 2, a diagram of a spacecraft is depicted in which advantageous embodiments may be implemented. In this example, spacecraft 200 may be produced by spacecraft manufacturing and service method 100 in FIG. 1. Spacecraft 200 may include structure 202 with a plurality of systems 204 and interior 206. Examples of systems 204 include, for example, without limitation, one or more of propulsion system 208, electrical system 210, hydraulic system 212, and environmental system 214. Any number of systems may be included. Further, in some implementations some of the systems may not be needed. For example, when spacecraft 200 takes the form of a launch vehicle, environmental system 214 may be unnecessary.

Apparatus and methods embodied herein may be employed during any one of stages of spacecraft manufacturing and service method 100 in FIG. 1. For example, components or subassemblies produced in component and subassembly manufacturing 106 in FIG. 1 may be fabricated or manufactured in a manner similar to components or subassemblies produced while spacecraft 200 is in service 112 in FIG. 1.

Also, one or more apparatus embodiments, method embodiments, or a combination thereof may be utilized during production stages, such as component and subassembly manufacturing 106 and system integration 108 in FIG. 1 as an example, without limitation. These embodiments may substantially expedite the assembly of or reduce the cost of spacecraft 200.

In these examples, advantageous embodiments may be implemented to attach components in propulsion system 208 to structure 202 in spacecraft 200. The different advantageous embodiments may be applied to attach any structure within spacecraft 200 to any other structure in other implementations.

The different advantageous embodiments take into account that it may be desirable to increase the strength of currently available joints between the structure of a spacecraft and a tank containing a propellant above current levels with respect to various forces. Forces on the joint may include, for example, without limitation, shear forces at the joint between the structure of a spacecraft and a tank. Current tanks may be metal tanks that typically use welded joints. In these examples, the joints may take the form of Y-joints. Composite tanks may be employed to provide weight savings over metal tanks. With these types of composite tanks, however, Y-joints with increased strength may not be possible with currently available Y-joint designs and techniques.

The different advantageous embodiments may use a softening strip to extend the strength of a bonded Y-joint between two structures. For example, without limitation, currently available large solid rocket motors may use a rubber softening strip in the Y-joints. The different advantageous embodiments take into account and recognize that a difficulty may be present in finding an appropriate material for a softening strip that may be usable for the different operating temperatures. With cryogenic tanks, these temperatures may be very low temperatures, such as, for example, without limitation, below −238 degrees Fahrenheit. These temperatures may also be referred to as cryogenic temperatures.

The different advantageous embodiments recognize that an appropriate material may remain soft at the different operating temperatures. Rubber materials, as currently used in solid rocket motors, may not be usable at cryogenic temperatures because these materials may become too stiff. The material needed may remain soft relative to the adherends while at cryogenic temperatures. An adherend may be a body attached to another body by the means of adhesive substance.

The different advantageous embodiments also take into account and recognize that a softening strip may have a coefficient of thermal expansion that may be matched or within some threshold limits of the adherends to prevent joint failure from thermally induced stresses.

Thus, the different advantageous embodiments provide a method and apparatus for reinforcing or forming joints, such as, for example, without limitation, Y-joints. In the different advantageous embodiments, a three-dimensional preform may be present in which a plastic matrix is impregnated into the three-dimensional preform to form a softening strip. This softening strip may be capable of remaining flexible at a temperature at which a material has a liquid form and in which the material has a gas form at an ambient temperature. In other words, the different advantageous embodiments may be used at temperatures at which a gas has a liquid state or form. As an example, without limitation, the softening strip may be capable of remaining flexible at cryogenic temperatures. A cryogenic temperature may be a temperature at which constituents of air may liquefy. A cryogenic temperature may be, for example, temperatures below around −150 degrees centigrade.

Figure 3:
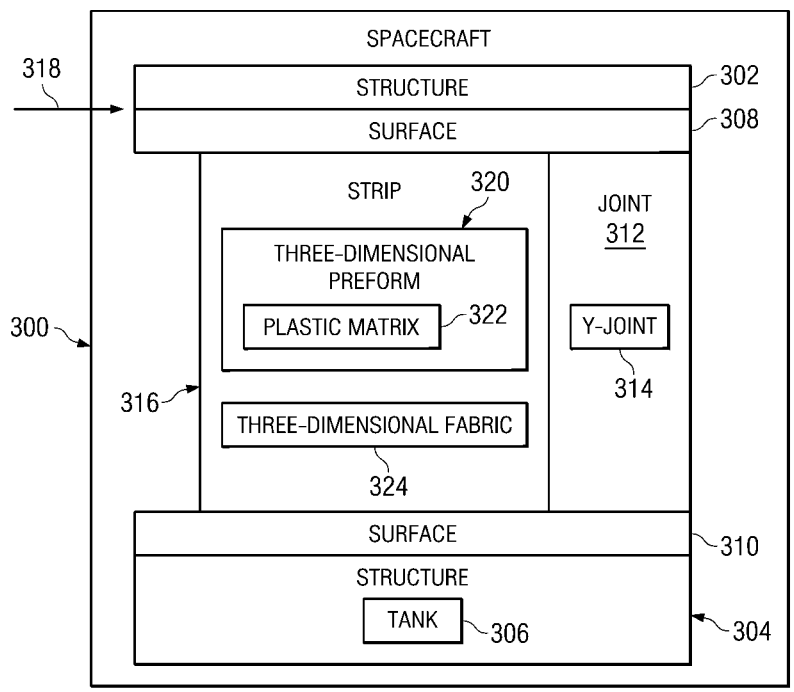
FIG. 3 is a diagram illustrating a spacecraft in accordance with an advantageous embodiment.

With reference now to FIG. 3, a diagram illustrating a spacecraft is depicted in accordance with an advantageous embodiment. Spacecraft 300 is an example of spacecraft 200 in FIG. 2. In this example, spacecraft 300 may include structure 302 and structure 304. Structure 302 may be the structure of the spacecraft providing a frame or other support for other components in spacecraft 300. Structure 304, in this example, may be, for example, without limitation, tank 306. Of course, structure 304 may be any other component that may be located within spacecraft 300 that is to be attached to structure 302.

Surface 308 of structure 302 may be attached to surface 310 of structure 304 to form joint 312. In these examples, joint 312 may take the form of Y-joint 314. The attachment, in these examples, may be performed by bonding surface 308 to surface 310. Bonding may be a process for fastening components or structures to each other. In these examples, bonding may be performed in a number of different ways. Bonding may include, for example, without limitation, using adhesives, welding, fasteners, curing processes, or some other suitable process.

The different advantageous embodiments may be applied to any type of structural joint such as, for example, without limitation, a joint in which loads peak near the shortest, stiffest load paths into a joint and then fall off to longer, softer load paths. Any extensive shear carrying lap joint may tend to transfer load more rapidly at the edges of the joint than away from the edges. This situation may be a consequence of load distribution through a structure being proportional to the relative stiffness of the available load paths.

Given the same cross-sectional areas, short load paths may be stiffer than long load paths. This situation may create the familiar phenomenon of shear peaking at joint ends. If an additional soft load path can be created outside the start of such a joint, part of the total load can be transferred through this additional path, lowering the load to be carried by the original joint and reducing shear peaking. This may be a feature of the softening strip.

A refinement in some joints may be to taper the softening strip so that the stiffness of the secondary load paths may be continually increased as the loads approach original joint. This feature may result in a more uniform transfer of shear across the joint at a consistent low level. This transfer may occur instead of the abruptly peaking shear characteristic of the simple lap joint or the two, more moderate, shear peaks that may be created by using a uniform thickness softening strip.

In this depicted example, strip 316 may be attached to surface 308 and surface 310 in and/or near joint 312. Strip 316 may act as a softening strip to increase the strength of joint 312 with respect to forces that may be applied to joint 312. These forces may include, for example, without limitation, shear forces on structures 302 and 304. In these examples, a shear force may be a force applied to structures 302 and 304 in the direction of line 318.

In the different advantageous embodiments, strip 316 may include three-dimensional preform 320 and plastic matrix 322. Three-dimensional preform 320 may be a three-dimensional structure and may take the form of three-dimensional fabric 324. This fabric may be, for example, without limitation, a fabric comprised of at least one of woven fibers, braided fibers, stacked fabric layers, and/or some other suitable material. When fibers are used, these fibers may include, for example, without limitation, graphite fibers, glass fibers, aramid fibers, metal fibers, or any other suitable structure fiber.

As used herein, the phrase "at least one of", when used with a list of items, means that different combinations of one or more of the items may be used, and only one of each item in the list may be needed. For example, "at least one of item A, item B, and item C" may include, for example, without limitation, item A, or item A and item B. This example also may include item A, item B, and item C, or item B and item C.

Plastic matrix 322 may be comprised of any plastic material that may retain or provide flexibility at operating temperatures for tank 306. Operating temperatures for tank 306 may be temperatures at or near cryogenic temperatures. In these examples, a plastic may be any synthetic or semi-synthetic polymerization material or product. Polymerization may be a process of reacting monomer molecules together in a chemical reaction to form linear chains or a three-dimensional network of polymer chains. Examples of types of plastics that may be used include, for example, without limitation, fluorocarbons and urethanes. One example of a fluorocarbon that may be used is a Teflon® polymer. Teflon® is a registered trademark of DuPont Company.

In this manner, tank 306 may be attached to structure 302 with joint 312 being formed in which strip 316 may be present. The use of strip 316 may provide additional reinforcement to add strength to resist various forces, such as, for example, without limitation, shear forces that may be applied to structure 304 and tank 306.

The illustration of spacecraft 300 in FIG. 3 is provided to illustrate one implementation for various advantageous embodiments. This illustration is not meant to imply architectural or physical limitations to a manner in which the different advantageous embodiments may be implemented. For example, structure 302 and structure 304 may be structures within another vehicle other than spacecraft 300. For example, the structures may be ones present in an aircraft. In other advantageous embodiments, spacecraft 300 may take the form of a spacecraft such as, for example, without limitation, a shuttle, a launch vehicle, a combination of a space shuttle and launch vehicle, or some other suitable vehicle capable of space travel.

Figure 4:
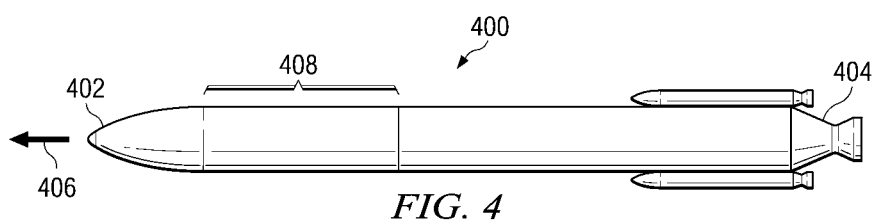
FIG. 4 is a diagram of a spacecraft in accordance with an advantageous embodiment.

With reference now to FIG. 4, a diagram of a spacecraft is depicted in accordance with an advantageous embodiment. In this example, launch vehicle 400 is an example of one implementation of spacecraft 300 in FIG. 3. Launch vehicle 400 has forward section 402 and aft section 404. Launch vehicle 400 may have longitudinal axis 406. Launch vehicle 400 is an example of a spacecraft in which Y-joint 314 in FIG. 3 may be implemented. Section 408 may be an example of a portion of launch vehicle 400 in which Y-joint 314 may be found and/or implemented.

Figure 5:
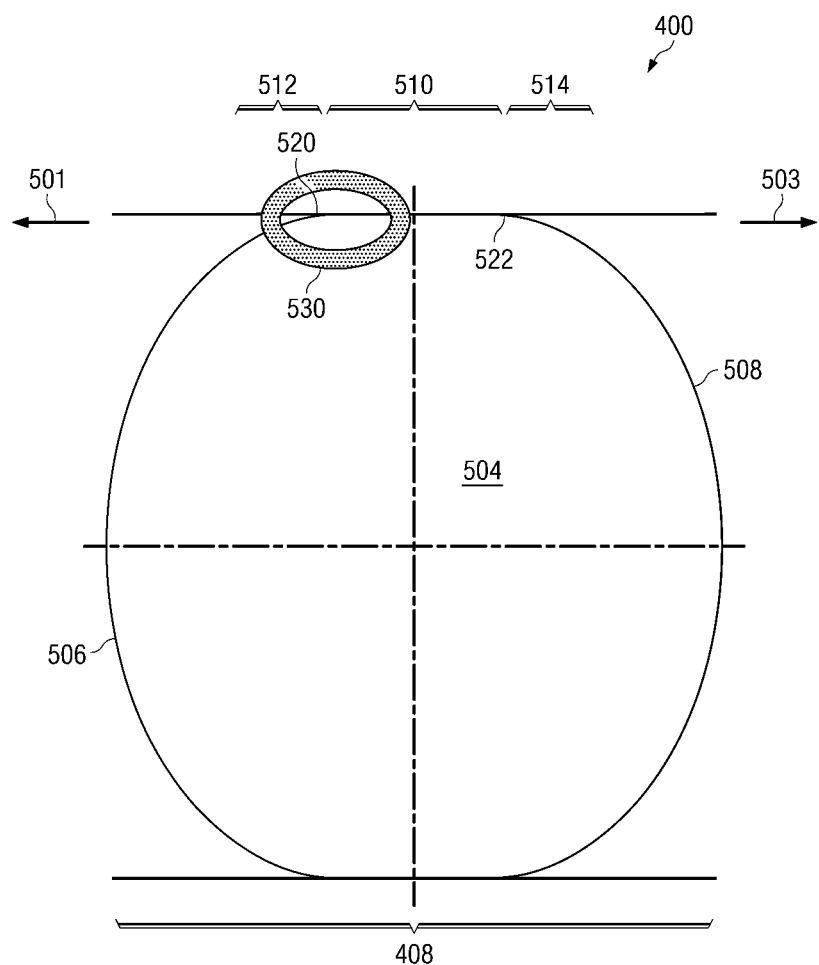
FIG. 5 is a diagram of a cross-sectional portion of a launch vehicle in accordance with an advantageous embodiment.

With reference now to FIG. 5, a diagram of a cross-sectional portion of a launch vehicle is depicted in accordance with an advantageous embodiment. In this diagram, a cross-section of section 408 of launch vehicle 400 along longitudinal axis 406 is depicted.

In this example, arrow 501 points towards the forward part of launch vehicle 400, while arrow 503 points to the aft portion of launch vehicle 400.

In this illustrative example, tank 504 in launch vehicle 400 may include dome 506, dome 508, and wall 510. Wall 510 may be a cylindrical wall in these examples. Wall 510 may be attached to forward skirt 512 and aft skirt 514. Wall 510 may be located between forward skirt 512 and aft skirt 514. In this example, wall 510 may be a pressurized portion of tank 504, while forward skirt 512 and aft skirt 514 may be located at unpressurized portions of tank 504.

Forward skirt 512 and aft skirt 514 are examples of structures to which tank 504 may be attached. In these examples, these different structures may be cylindrical in form of which only a cross-section may be seen in FIG. 5. In this depicted example, Y-joint 520 and Y-joint 522 may be present. Y-joint 520 may be formed from the intersection of dome 506, wall 510 and forward skirt 512. Y-joint 522 may be formed at the intersection of dome 508, wall 510, and aft skirt 514. In these examples, Y-joint 520 and Y-joint 522 may be continuous in circumferential direction around axis 524.

In these examples, tank 504 may take the form of a composite cryogenic tank. Tank 504 may hold a propellant, such as, for example, without limitation, liquid hydrogen and/or liquid oxygen. In this example, tank 504 may hold liquid hydrogen. In this example, tank 504 may be greater than around 16 feet in diameter. A more detailed illustration of Y-joint 520 in section 530 is shown in FIG. 6 below.

Figure 6:
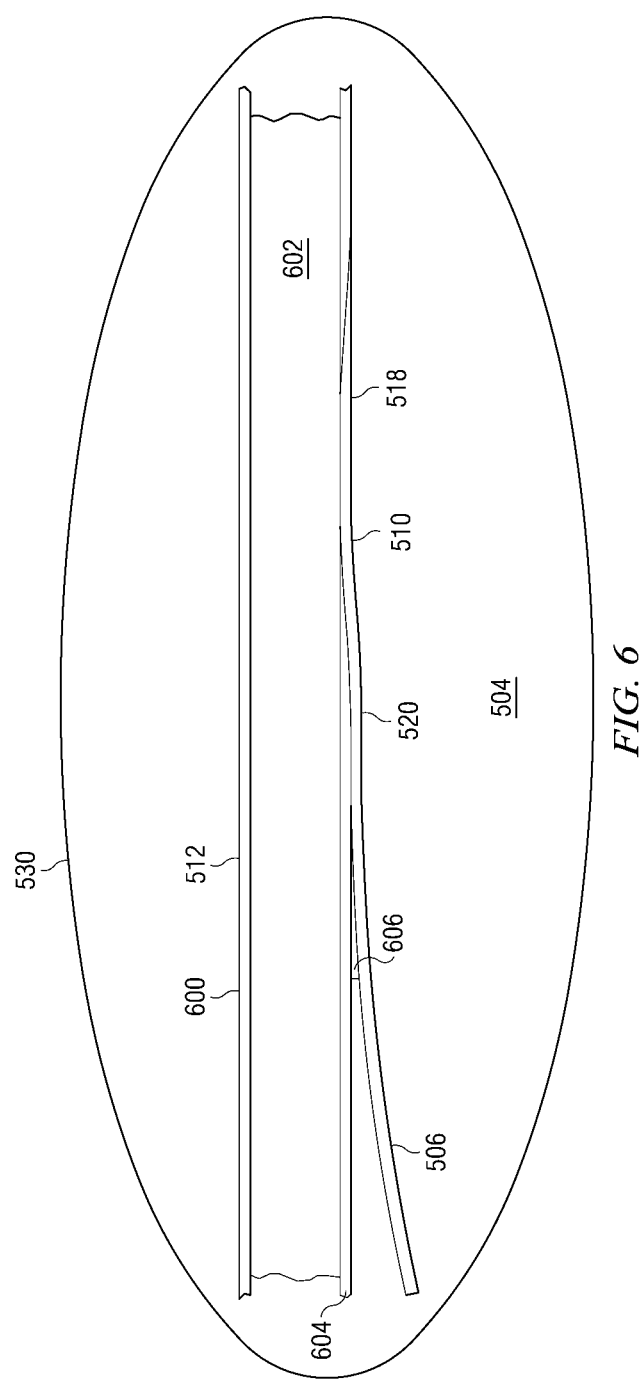
FIG. 6 is a diagram of a joint in accordance with an advantageous embodiment.

Turning now to FIG. 6, a diagram of a joint is depicted in accordance with an advantageous embodiment. As illustrated in section 530, forward skirt 512 may include outboard skin 600, core 602, and inboard skin 604. In this example, outboard skin 600 and inboard skin 604 may be face sheets with core 602 being located between those face sheets. Core 602 may be a low density structure element. Core 602 may be used, amongst other uses, to transmit loads between outboard skin 600 and inboard skin 604. Core 602 may take various forms. For example, core 602 may have flutes, honeycombs, or other suitable forms. In these examples, a fluted structure may be a desired structure for core 602.

In this illustrative example, Y-joint 520 may be formed at the intersection of dome 506, wall 510, and forward skirt 512. Y-joint 520 may have softening strip 606 located in or near Y-joint 520. Softening strip 606 may be bonded to inboard skin 604 and tank 504.

In the different advantageous embodiments, softening strip 606 may be co-bonded to inboard skin 604 and tank 504 along with the bonding of inboard skin 604 to tank 504. In other words, these different components may be co-bonded to each other at the same time. The co-bonding, in these examples, may take the form of one or more curing processes in which the composite components in softening strip 606, inboard skin 604, and tank 504 may be cured to bond these components to each other.

The illustration of tank 504 is presented for purposes of depicting one manner in which different advantageous embodiments may be implemented. The softening strip 606, in the different advantageous embodiments, may be applied to other tank and/or skirt geometries. For example, although tank 504 is shown with a cylindrical wall, other tank configurations may be employed. As an example, a conical wall for wall 510 may be used. Also, other tanks may not be readily symmetric. Regardless of the structure or shape of tank 504, a Y-joint may be used.

Figure 7:
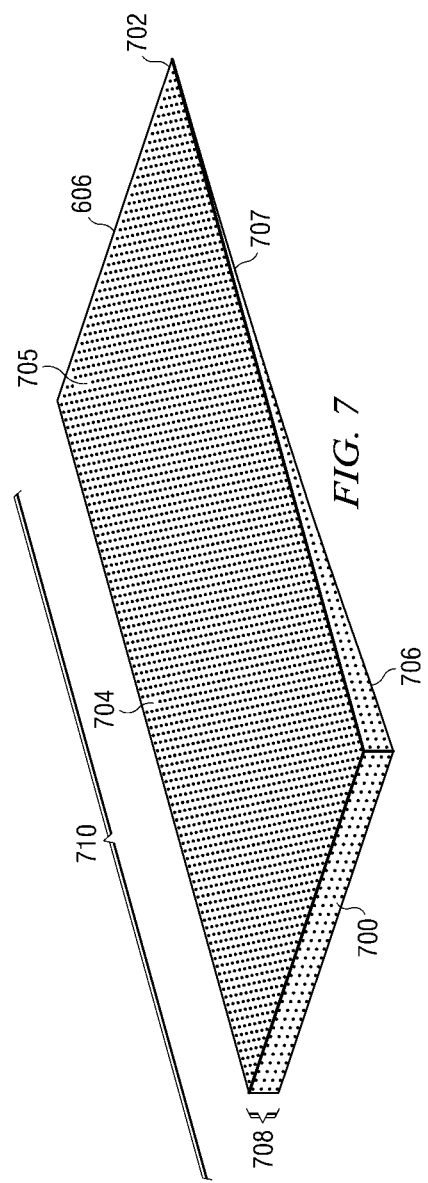
FIG. 7 is a diagram illustrating a softening strip in accordance with an advantageous embodiment.

With reference now to FIG. 7, a diagram illustrating a softening strip is depicted in accordance with an advantageous embodiment. In the illustrated example, softening strip 606 is shown in a perspective view. The illustration of softening strip 606 in this example is only a portion of softening strip 606. Softening strip 606 may be circular in shape to follow the perimeter of wall 510. The dimensions of softening strip 606 may vary depending on the particular implementation. In this example, end 700 of softening strip 606 may have a thickness of around 0.2 inches in section 708. In these examples, end 702 may have a thickness that is as thin as practicable to prevent introduction of a stress riser in Y-joint 520. In these illustrative examples, a thickness of end 702 may be as thin as practical, based on the ease of manufacturing and/or handling.

With respect to the use of softening strip 606 in Y-joint 520, softening strip 606 may have a length of around 4 inches from end 700 to end 702 as shown in section 710. Further, softening strip 606 may extend around the full circumference of tank 504 in these examples. Other dimensions of softening strip 606 may vary depending on the particular implementation. Of course, softening strip 606 may have any dimensions needed to be placed within a Y-section or other space in a joint between structures. Although a constant and/or uniform cross-section is shown for softening strip 606, the cross-section may vary depending on the configuration of the joint.

Softening strip 606 may be shaped in a manner to fit within Y-joint 520 as shown in FIG. 6. In this example, softening strip 606 may have a wedge shape in which softening strip 606 may be thicker at end 700 than at end 702.

Faying surface 704 on side 705 of softening strip 606 may be bonded to inboard skin 604 in FIG. 6 and faying surface 706 on side 707 of softening strip 606 may be bonded to tank 504 in FIG. 5. Softening strip 606 may be co-cured with the other components forming Y-joint 520 as shown in FIG. 6.

Figure 8:
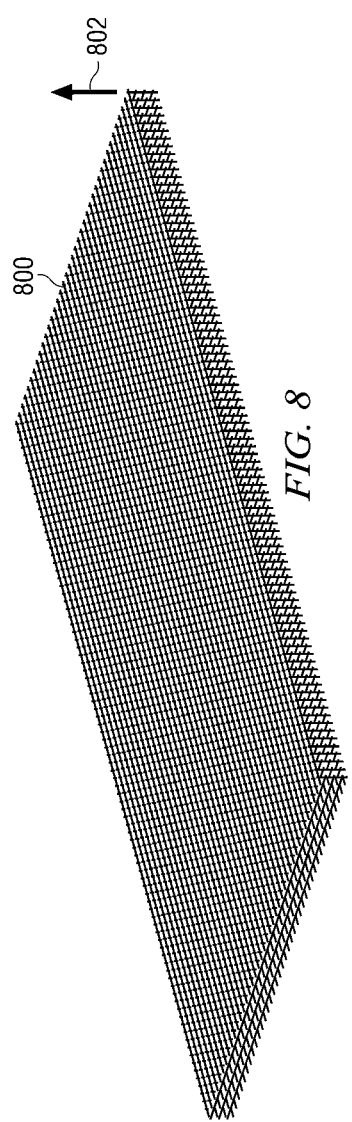
FIG. 8 is a diagram illustrating a three-dimensional preform in accordance with an advantageous embodiment.

With reference now to FIG. 8, a diagram of a three-dimensional preform is depicted in accordance with an advantageous embodiment. Preform 800 is an example of three-dimensional preform 320 in FIG. 3.

In the illustrative example, preform 800 may be a woven three-dimensional graphite fiber preform. Of course, other types of materials and other types of structures may be used for preform 800. Other examples of materials that may be used in preform 800 include, for example, without limitation, fiberglass fibers, boron fibers, aramid fibers, polyethylene fibers, and other suitable materials. Preform 800 may be formed from braided fibers or stacked or layered fabric. The stack of fabric materials may then be held together using z-pinning in which pins may be inserted and pushed into the stack of fabric in an autoclave with pressure. As another example, fabric materials for preform 800 may be stitched to each other in the third dimension as indicated by arrow 802.

Figure 9:
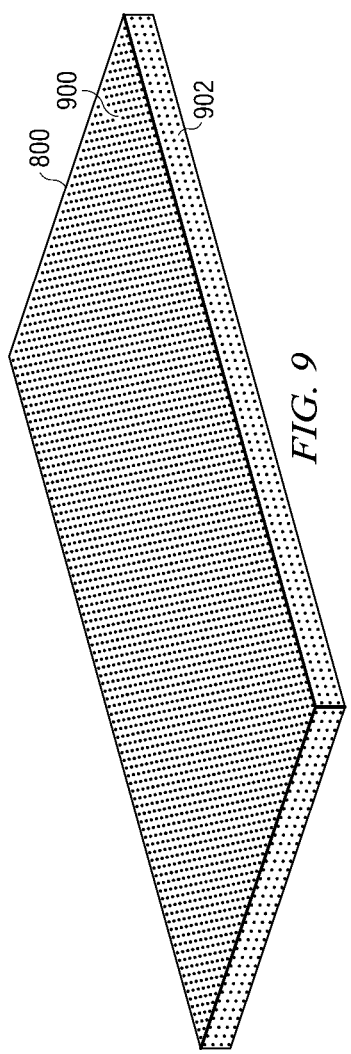
FIG. 9 is a diagram illustrating a softening strip in accordance with an advantageous embodiment.

With reference now to FIG. 9, a diagram illustrating a softening strip is depicted in accordance with an advantageous embodiment. In this example, preform 800 may have been infused with plastic matrix 900. The plastic material within plastic matrix 900 may be placed into preform 800 using any method or process suitable for placing plastic matrix 900 into preform 800.

In these examples, plastic matrix 900 may be any plastic material capable of maintaining flexibility at temperatures in which a material may be in a liquid form when that material normally may be in a gas form at ambient temperatures. In these examples, ambient temperature may be the temperature of the environment around the spacecraft. In other words, the ambient temperature may be the temperature in the air around the spacecraft when the spacecraft is on the ground.

This combination of preform 800 and plastic matrix 900 forms softening strip 902. Softening strip 902 may then be machined, cut, and/or formed in some other suitable fashion in a shape, such as softening strip 606 in FIG. 6 for use in a Y-joint.

Preform 800 may restrain softening strip 902 against excessive thermal shrinkage that may be associated with high coefficients of expansion. These high coefficients of expansion may be typical of softening strip matrix materials, such as those for plastic matrix 900, which may remain flexible at cryogenic temperatures. Excessive shrinkage in any direction may create thermally induced stresses in the bond lines between softening strip 902 and any adjacent structure. These types of stresses may weaken the joint. As a result, softening strip 902 may be constructed with preform 800 to provide three-dimensional reinforcement, rather than two-dimensional reinforcement.

Figure 10:
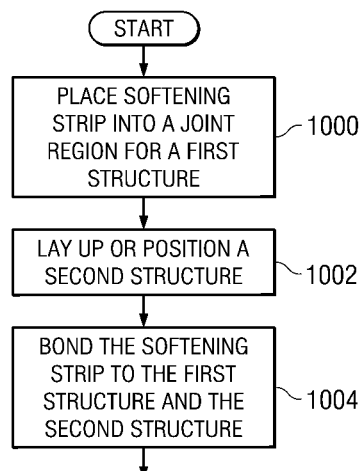
FIG. 10 is a flowchart of a process for creating a Y-joint in a structure in accordance with an advantageous embodiment.

With reference next to FIG. 10, a flowchart of a process for creating a Y-joint in a structure is depicted in accordance with an advantageous embodiment. The process illustrated in FIG. 10 may be used to create a joint between a first structure and a second structure.

The process begins by placing a softening strip into a joint region for a first structure (operation 1000). The softening strip is capable of remaining flexible at a temperature at which the gas has a liquid form. The process then lays up and/or positions a second structure (operation 1002). Thereafter, the softening strip is bonded to the first structure and the second structure to form the joint (operation 1004), with the process terminating thereafter. This bonding may be performed using various mechanisms, including co-curing, curing, or other suitable bonding techniques.

Figure 11:
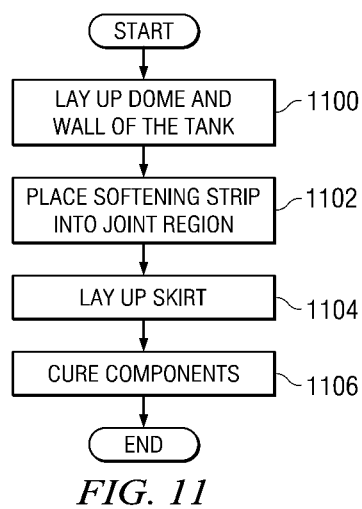
FIG. 11 is a flowchart of a process for creating a Y-joint for a tank in accordance with an advantageous embodiment.

With reference to FIG. 11, a flowchart of a process for creating a Y-joint for a tank is depicted in accordance with an advantageous embodiment. The process illustrated in FIG. 11 may be a detailed example of one implementation of the processes in FIG. 10. The process illustrated in FIG. 11 may be used to create a Y-joint between a composite cryogenic tank and a composite skirt.

The process may begin by laying the dome and wall of the tank (operation 1100). Thereafter, a softening strip may be placed into the joint region (operation 1102). In operation 1002, the softening strip may be placed into the region with an adhesive film.

Next, a skirt structure is laid up (operation 1104). The skirt structure may be laid up over the area where the dome and wall may be located along with the softening strip. The components are then cured (operation 1106), with the process terminating thereafter. The curing step may be performed using heat and/or pressure. This curing may be performed using an autoclave or some other suitable oven. In other advantageous embodiments, these components may be cured using an electron beam. The result of curing operation 1106 may be a joint similar to joint 520 in FIG. 5.

Figure 12:
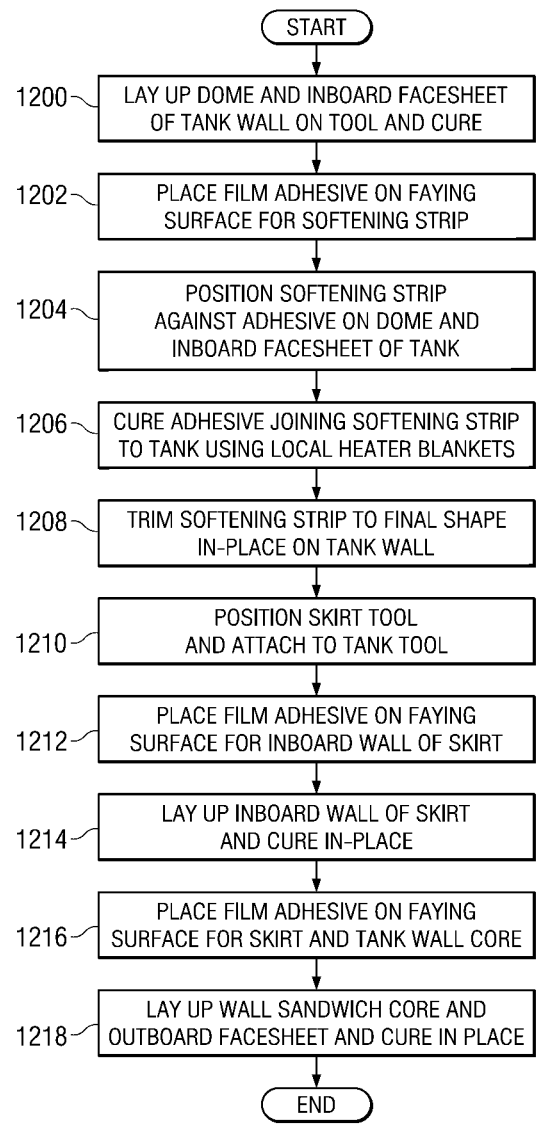
FIG. 12 is a flowchart of a process for creating a Y-joint between a composite cryogenic tank and a composite skirt in accordance with an advantageous embodiment.

With reference now to FIG. 12, another flowchart of a process for creating a Y-joint between a composite cryogenic tank and a composite skirt is depicted in accordance with an advantageous embodiment.

The process may begin by laying up the dome and inboard face sheet of the wall of the tank on a tool and curing the lay up (operation 1200). The dome may be, for example, without limitation, dome 506, and the face sheet of the tank wall may be for a wall such as, for example, without limitation, wall 510 in FIG. 5. In these examples, the tool may be a mold for the shape of the different composite components.

The process may place a film adhesive on faying surfaces 704 and 706 for the softening strip (operation 1202). The softening strip in operation 1202 may be a softening strip such as, for example, without limitation, softening strip 606 in FIG. 7. In these examples, faying surfaces 704 and 706 are the surfaces of a structure that are to be bonded to another structure. In other words, when two structures are bonded to each other, the surfaces that contact each other to form the joint may be referred to as the faying surfaces.

The process may then position the softening strip against the adhesive on the dome and inboard face sheet for the wall of the tank (operation 1204). The process may then cure the adhesive joining softening strip to the tank using local heater blankets (operation 1206). After operation 1206, the softening strip may be bonded to the tank wall. The softening strip may then be trimmed into a final shape in place on the tank wall (operation 1208). The process may then position a skirt tool and attach the skirt tool to the tank tool (operation 1210).

The process may then place film adhesive on faying surfaces 704 and 706 for the inboard wall of skirt 512 (operation 1212). The process may then lay up the inner wall of the skirt and cure the component in place (operation 1214).

Next, adhesive may be placed on faying surfaces 704 and 706 for skirt 512 and core 602 (operation 1216). Core 602 may be the structural elements located between two face sheets for the wall of the structure. The process may then lay up the wall sandwich core and outboard face sheet and cure the components in place (operation 1218) with the process terminating thereafter. In operation 1218, the outboard face sheet may be, for example, outboard skin 600 in FIG. 6.

Figure 13:
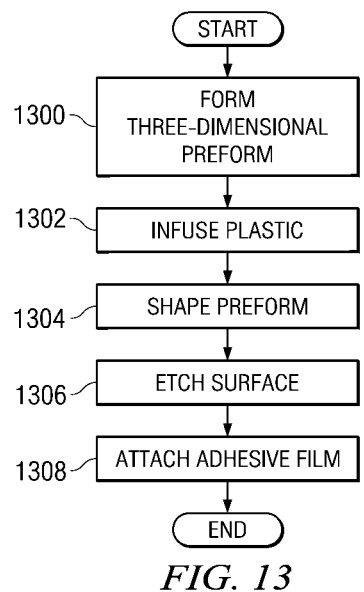
FIG. 13 is a flowchart of a process for creating a softening strip in accordance with an advantageous embodiment.

With reference now to FIG. 13, a flowchart of a process for creating a softening strip is depicted in accordance with an advantageous embodiment. The process illustrated in FIG. 13 may be used to create a softening strip for use in the operations in FIGS. 11 and 12.

The process may begin by forming a three-dimensional preform (operation 1300). In these examples, operation 1300 may be performed using, for example, without limitation, braiding fibers, weaving fibers, stacking materials and performing z-pinning, or some other suitable process.

Next, a plastic matrix may be infused into the three-dimensional preform (operation 1302). In these examples, the plastic matrix may be a Teflon® polymer. With this type of polymer, a dry powder may be placed onto the three-dimensional preform and worked into the preform. For example, the infusion in operation 1302 may involve vibrating the preform and then applying heat and pressure to perform the infusion into the preform. The heat and pressure in operation 1302 may be performed using an autoclave.

The preform may be shaped (operation 1304). In operation 1304, the preform may be machined, cut, or shaped using some other suitable process into a shape for use in a Y-joint. The process may etch the surfaces, faying surface 704 and faying surface 706 of the softening strip (operation 1306). This etching may be an acid etch. Tertra-Etch® fluorocarbon etchant is an example of a commercially available etchant used to prepare fluorocarbon surfaces for bonding. Tertra-Etch® fluorocarbon etchant may be available from W. L. Gore and Associates, Inc., and Tertra-Etch® is a trademark of W. L. Gore and Associates, Inc. This etching may be used to allow an adhesive film to be attached to the surface of the preform. The process may then attach an adhesive film to each side, side 708 and side 707, of the softening strip (operation 1308), with the process terminating thereafter. The adhesive strips may allow the softening strip to be attached and cured to the skirt and the dome of the tank during the curing process.

The different operations shown in the flowcharts may not be inclusive of all of the different steps that may be performed for the different advantageous embodiments. For example, other operations such as, for example, without limitation, preparation for bonding, shimming, caul plating, and other suitable operations may be performed during the different processes illustrated above. Also, in some advantageous embodiments, some of the operations may be performed concurrently or in different orders, depending upon the particular implementation.

Thus, the different advantageous embodiments provide a method and apparatus for increasing the strength of a joint between different structures. The different advantageous embodiments may include a three-dimensional preform with a plastic matrix impregnated or infused into the three-dimensional preform to form a softening strip. This softening strip is capable of remaining flexible at a temperature in which a material having a gas form at an ambient temperature has a liquid form.

The description of the different advantageous embodiments has been presented for purposes of illustration and description, and is not intended to be exhaustive or limited to the embodiments in the form disclosed. Many modifications and variations will be apparent to those of ordinary skill in the art.

Although the different illustrative examples show the use of a softening strip in a Y-joint for a spacecraft, this softening strip may be used in objects other than spacecraft. For example, without limitation, a softening strip may be used in a joint for structures in a submarine, an aircraft, a building, a dam, a manufacturing facility, a power plant, a tank, a car, or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for providing a joint with a tank comprising:
   a three-dimensional fabric preform; and
   a plastic matrix impregnated in the three-dimensional fabric preform to form a softening strip that remains flexible at a temperature at which a gas has a liquid form, the softening strip attached to a surface of the tank.

2. The apparatus of claim 1 further comprising:
   a first structure having a first side; and
   the tank having a first side bonded to the first side of the first structure, wherein the softening strip is bonded to a portion of the first side of the first structure and a portion of the first side of the second structure to form a joint.

3. The apparatus of claim 2, wherein the joint is a Y-joint.

4. The apparatus of claim 2, wherein the first structure is a structure for one of a launch vehicle, a spacecraft, and an aircraft.

5. The apparatus of claim 4, wherein the tank is configured to hold a liquid propellant.

6. The apparatus of claim 2, wherein the first structure comprises a material selected from one of a metal, a metal alloy, and a composite material.

7. The apparatus of claim 2, wherein the second structure comprises a material selected from one of a metal, a metal alloy, and a composite material.

8. The apparatus of claim 1, wherein the three-dimensional fabric comprises fibers selected from at least one of weaved fibers, braided fibers, and stacked fabric layers.

9. The apparatus of claim 8, wherein the fibers are graphite fibers.

10. The apparatus of claim 1, wherein the plastic matrix is selected from at least one of a fluorocarbon and a urethane.

11. A Y-joint apparatus for securing a fuel tank carrying cryogenic materials to a spacecraft structure comprising:
    a three-dimensional fabric preform; and
    a plastic matrix impregnated in the three-dimensional fabric preform to form a softening strip that remains flexible at a temperature at which a gas has a liquid form, the softening strip attached to a surface of the fuel tank and to a surface of the spacecraft structure.

12. The Y-joint apparatus of claim 11, wherein the second tank holds a liquid propellant.

13. The Y-joint apparatus of claim 11, wherein the fuel tank comprises a material selected from one of a metal, a metal alloy, and a composite material.

14. The Y-joint apparatus of claim 11, wherein the spacecraft structure comprises a material selected from one of a metal, a metal alloy, and a composite material.

15. The Y-joint apparatus of claim 11, wherein the three-dimensional fabric comprises fibers selected from at least one of weaved fibers, braided fibers, and stacked fabric layers.

16. The Y-joint apparatus of claim 15, wherein the fibers are graphite fibers.

17. The Y-joint apparatus of claim 11, wherein the plastic matrix is selected from at least one of a fluorocarbon and a urethane.

* * * * *